No. 12,026. Reissued Aug. 26. 1902.
W. G. BROWNE.
EGG BEATER.
Application filed Nov. 1, 1901.
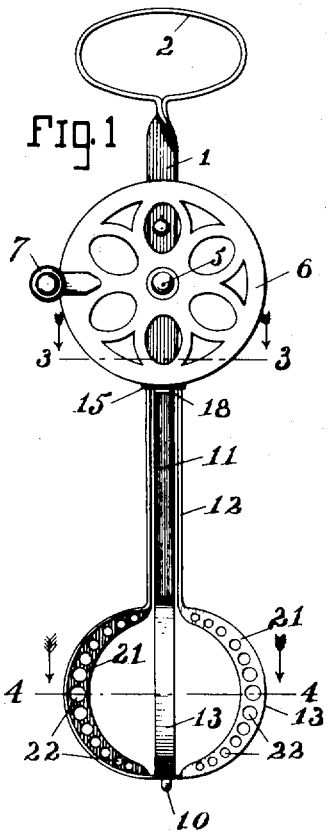
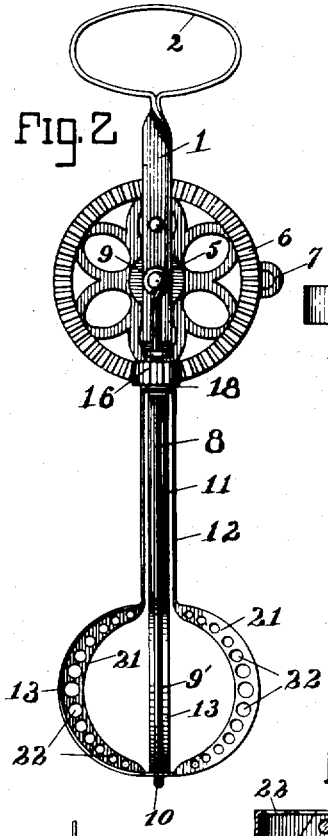
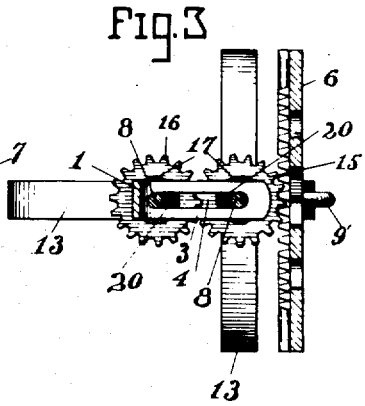
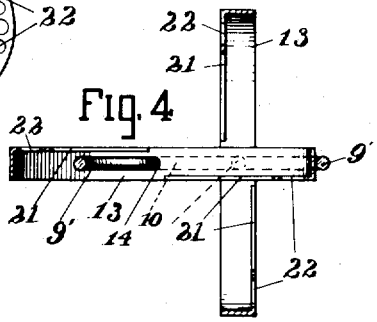
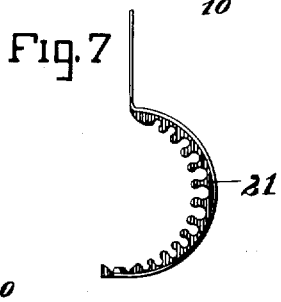
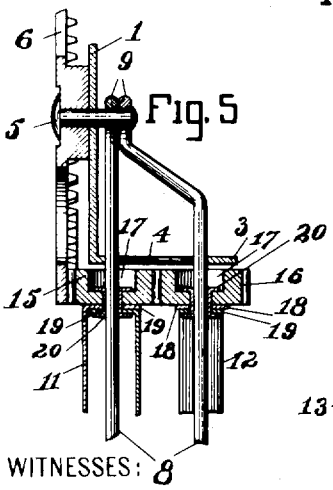
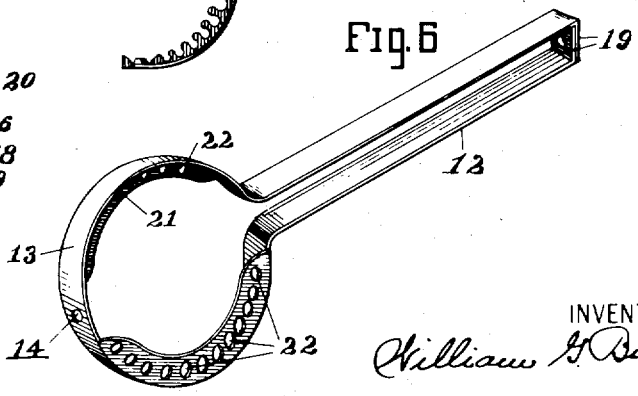
WITNESSES:
C. H. Berthoff
F. P. Wentworth
INVENTOR
William G. Browne
BY
Nathaniel L. Frothingham
ATTORNEY

UNITED STATES PATENT OFFICE.

WILLIAM G. BROWNE, OF KINGSTON, NEW YORK, ASSIGNOR TO THE W. G. BROWNE MANUFACTURING COMPANY, A CORPORATION OF NEW YORK.

EGG-BEATER.

SPECIFICATION forming part of Reissued Letters Patent No. 12,026, dated August 26, 1902.

Original No. 678,456, dated July 16, 1901. Application for reissue filed November 1, 1901. Serial No. 80,826.

*To all whom it may concern:*

Be it known that I, WILLIAM G. BROWNE, a citizen of the United States, residing at Kingston, in the county of Ulster and State of New York, have invented certain new and useful Improvements in Egg-Beaters, of which the following is a specification, reference being had therein to the accompanying drawings.

My invention relates to improvements in egg-beaters or other similar utensils provided with rotary cutter and beater blades and especially adapted to beat eggs, whip cream, or other analogous purposes.

The object of the invention is to provide a utensil of this character wherein the beater-blades will so act upon the mass of eggs, cream, or other matter as to draw it toward and within the said beater-blades, where it will be brought repeatedly within the cutting and beating areas of said blades.

A further object is to so construct said blades that the mass so brought within their influence will be so cut, beaten, and separated into minute particles as to be reduced to the desired state in a minimum space of time.

A still further object is to provide a utensil capable of accomplishing the desired results which will be simple in construction and arrangement of parts and inexpensive to manufacture.

To this end the invention consists in the novel features of construction hereinafter set forth and described, and more particularly pointed out in the claims hereto appended.

Referring to the drawings, Figure 1 is a side elevation of the preferred form of my improved egg-beater. Fig. 2 is a similar view of the reverse side thereof. Fig. 3 is a horizontal section on the line 3 3 of Fig. 1 looking downward. Fig. 4 is a similar view on the line 4 4 of Fig. 1. Fig. 5 is a detail sectional view through the pinions and connecting parts. Fig. 6 is a detail perspective view of one of the beater-blades detached, and Fig. 7 is a detail view of a fragment of a modified form of beater-blade.

Like reference-numerals refer to like parts throughout the several views.

In the drawings the reference-numeral 1 indicates the handle of the beater, which is made of strip metal bent to form the hand-loop 2 and a shank therefor, which latter is extended laterally at its lower extremity to provide the arm 3, having an elongated opening or slot 4 therein. The beater-frame 8 is formed of a metal rod bent to form a rest 10, approximately centrally thereof, a shoulder at each end of said rest, and two supports comprising, respectively, a semicircular bow 9′ and a vertical shaft passing upward through the slot 4 and terminating in an eye 9, by means of which said frame is permanently connected to the shank of the handle 1. Mounted upon and adapted to rotate about each of the supports of the frame 8 are the beater-blades 11 and 12, which are each composed of strip metal bent centrally thereof to form two approximately semicircular or bowed beating portions 13 diametrically opposite and parallel to each other and having a common axis formed by one of the shoulders on the rest 10, respectively, the said beater-blades being provided with an opening 14 centrally thereof, by means of which it is mounted thereon. After the formation of the opposite concentric bowed portions 13 of each beater-blade the free ends of the strip are extended upward on opposite sides of each shaft of the beater-frame and parallel therewith and with each other and the extremities 19 thereof bent inwardly and overlapped, as shown, registering openings in said overlapped portions of the ends 19 being formed to permit the shaft of the beater-frame to pass therethrough. The shafts of the beater-frame being spaced apart, the beater-blades will necessarily be mounted eccentrically as to each other, and it is therefore necessary to so arrange them that in rotating they will not contact at any point of their revolution—an arrangement well known in this art. These beater-blades 11 and 12 are simultaneously and reversely rotated by means of intermeshing pinions 15 and 16, which are respectively secured thereto by means of a tubular rivet 21, encompassing the shaft of the beater-frame 8, passing through the registering openings in the overlapped ends 19 of the respective beater-blades and the pinion 15 or 16, and upset or clenched to maintain these parts in a fixed relative position. The top of each pinion is countersunk, as at 17, to facilitate this connection. To prevent independent rotation of either the beater-blade or its pinion, I provide lugs or shoulders 18 on each pinion, between which the ends of the respective beater-blades are seated.

Power is derived through the main drive-gear 6, which is turned by means of the handle 7, said gear 6 being in mesh with one of the pinions through which the remaining pinion and its beater-blade is reversely rotated. The gear 6 is mounted on a pin 5, which passes through the shank of the handle 1 and the eyes 9 on the ends of the beater-frame 8 to connect said frame to said handle. The bowed portions 13 of each of the beater-blades 11 and 12, as aforesaid, are diametrically opposite and parallel to each other, and being formed of flat metal the surface thereof forward of the mean radius of each as to the course of travel of the entire beater-blade when in use is at all times tangential to the circle inscribed by that radius of the blade at all points of the bow. Projecting inwardly from the rear of each bowed portion 13 is a segmental or crescent-shaped flange 21, having a plurality of openings 22 therein. The flange 21 is formed at such an angle to the bowed portion 13 that an open gathering and retarding pocket is formed by the angle between it and said bowed portion. Preferably the apertures 22 are small round openings; but the configuration, number, and relation of said openings may be varied indefinitely without departing from the spirit of my invention. In Fig. 7 I have shown a form of bowed portion and flange wherein the openings in the flange 21 are cut entirely through the edge of said flange.

The operation of the actuating mechanism of the egg-beater is well known in the art, and I lay no claim to such mechanism. The eccentrically-mounted beater-blades 11 and 12 are simultaneously and reversely rotated by means of the intermeshing pinions 15 and 16, carried thereby, and the main drive-gear 6, meshing with one of them, each beater-blade rotating about one of the supports of the beater-frame 8, the bowed portion 9′ of which permits the beater-blade mounted on the other support to rotate freely. In the course of each revolution each bowed portion 13 passes the bowed portions of the other and within the space encompassed thereby.

In using the egg-beater the bowed portions of the beater-blades are immersed in the eggs, cream, or other matter and rapidly rotated, as before explained. As the beater-blades rotate the forward and cutter edge of each bowed portion acts upon the matter within its operative area to disrupt it to a certain limited extent, the pockets formed by the angles between the bowed portion and the flanges 21 gathering and retaining momentarily the matter so acted upon until it escapes therefrom in a plurality of minute streams through the openings 22 in said flanges, respectively. Such matter as is not retained in said pockets, as well as that which escapes through the said openings, is thrown or drawn into the path of the other beater-blade in a manner more fully described below, where it will be subjected to this treatment, the repeated passage of the matter through the openings 22 tending toward its rapid disruption. In actual practice I have found that the construction heretofore described acts as above, and in addition that as the beater-blades rotate the flanges on the bowed portions thereof, respectively, tend to retard the progress of the beater-blade through the mass to an extent which results in an accumulation of the matter in advance of the pocket of each bowed portion of each beater-blade and in the formation of reversely-flowing rotary streams comprised of the matter which escapes through the opening 22 which is not retained in the pockets and which forms a part of the accumulation above referred to. These streams follow the course of the circle inscribed by each beater-blade, respectively, and meet as the bowed portions pass one within the other, at which period they are united and drawn by the suction created within the rapidly-rotating blades, together with a goodly percentage of air, which aids in the rapid aeration thereof. The matter so drawn within the blades is subjected to the cutting, beating, and separating action of the bowed portions and flanges of the next succeeding beater-blades. A large portion of such matter as is not thoroughly acted upon is accumulated in advance of said pockets and expelled from within said blades as additional matter is drawn within them, as already described. The matter so expelled passes from the control of the retarding-pocket; but as the bowed portions pass through it it is drawn after the beater-blades to form part of the streams above referred to.

The peculiar construction of the beater-blades creates a centripetal force, which acts upon the matter within the receptacle to an extent which draws it away from the sides of such receptacle into the streams aforesaid, and when the albuminous portion of a single egg is beaten it is found that upon completion of the beating process almost the entire mass is centered within and about the beater-blades.

As the beater-blades move with greater rapidity than the matter constituting the streams, a portion of this matter is constantly being acted upon by the cutting edge and the pocket with the openings through which it passes.

It is not my intention to limit the invention to the precise construction herein shown and described, as it is obvious that there may be many deviations therefrom without departing from the spirit or scope of my invention.

I am aware that actuating mechanism such as is herein shown and described is old and well known in the art, and I lay no claim to this feature, as the invention resides in the peculiar construction of the beater-blades, which may be rotated by any well-known means.

Having described my invention, what I claim as new, and desire to have protected by Letters Patent, is—

1. In an egg-beater, a rotary beater-blade comprising a flat bowed portion and a flange projected therefrom at an angle and in a relation to the forward edge thereof whereby said forward edge constitutes a cutter-blade and an open gathering and retarding pocket is formed by the angle between the flat surface of said bowed portion and said flange, in combination with means whereby said blade is rotated.

2. In an egg-beater, a rotary beater-blade comprising a flat bowed portion and a flange projected therefrom at an angle and in a relation to the forward edge thereof whereby said forward edge constitutes a cutter-blade and an open gathering and retarding pocket is formed by the angle between said flat surface of said bowed portion and said flange, said flange being provided with a plurality of openings to permit the escape of matter gathered in said pocket in minute streams, in combination with means whereby said beater-blade is rotated.

3. In an egg-beater, the combination with a plurality of rotary beater-blades each comprising a bowed portion, and a flange projected therefrom at an angle and in a relation to the forward edge thereof, whereby said forward edge constitutes a cutter-blade and an open gathering and retarding pocket is formed by the angle between said bowed portion and said flange, said flange being provided with a plurality of openings to permit the escape of matter gathered in said pocket in minute streams, of means whereby said blades may be simultaneously and reversely rotated.

4. In an egg-beater, the combination with a plurality of eccentrically-mounted rotary beater-blades each comprised of diametrically opposite flat and parallel bowed portions and a crescent-shaped or segmental flange projected inwardly at an angle therefrom and in a relation to the forward edge thereof whereby said forward edge constitutes a cutter-blade and an open gathering and retarding pocket is formed by the angle between the flat surface of said bowed portion and said flange, said flange being provided with a plurality of openings to permit the escape of matter gathered in said pocket of means whereby said beater-blades may be simultaneously and reversely rotated.

In witness whereof I have hereunto affixed my signature, this 26th day of October, 1901, in the presence of two witnesses.

WILLIAM G. BROWNE.

Witnesses:

FRANK W. BROOKS,

CHARLES W. WALTON.